United States Patent
Kakinoki

(10) Patent No.: US 6,706,378 B1
(45) Date of Patent: Mar. 16, 2004

(54) BONDING SURFACE STRUCTURE AND BONDING STRUCTURE THEREWITH

(75) Inventor: Wataru Kakinoki, Yokohama (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 09/518,411

(22) Filed: Mar. 3, 2000

(30) Foreign Application Priority Data

Mar. 29, 1999 (JP) .......................................... 11-086107

(51) Int. Cl.⁷ .............................. B32B 7/02; H05K 1/14; H05K 7/20; H05K 1/00
(52) U.S. Cl. ........................ 428/214; 361/737; 361/720; 361/748
(58) Field of Search ........................ 428/214; 361/737, 361/720, 748

(56) References Cited

U.S. PATENT DOCUMENTS

| | | | |
|---|---|---|---|
| 4,303,949 A | * 12/1981 | Peronnet | 360/2 |
| 4,578,294 A | * 3/1986 | Ouchi et al. | 428/35 |
| 5,173,841 A | * 12/1992 | Uenaka et al. | 361/399 |
| 5,312,659 A | * 5/1994 | Otsuka et al. | 428/35.2 |
| 5,497,297 A | * 3/1996 | Kilmer et al. | 361/737 |

* cited by examiner

Primary Examiner—Cynthia H. Kelly
Assistant Examiner—L. Ferguson
(74) Attorney, Agent, or Firm—Dickstein, Shapiro, Morin & Oshinsky, LLP.

(57) ABSTRACT

Two types of bonding layers having different chemical components and different chemical and/or physical properties are alternately formed in a bonding layer forming region. An exemplary combination of the two types of bonding layers includes a bonding layer which is resistant to high-temperature environments and another bonding layer which is resistant to impacts. A product having such a bonding surface structure is resistant to both high-temperature environments and impacts and has a highly stable bonding structure.

20 Claims, 6 Drawing Sheets

BONDING SURFACE STRUCTURE AND BONDING STRUCTURE THEREWITH

BACKGROUND OF THE INVENTION

1. Field of the Invention

The present invention relates to a bonding surface structure provided with bonding layers and to a bonding structure having the bonding surface structure.

2. Description of the Related Art

FIG. 1 shows a cover 1 and a frame 3 for a card having a conventional bonding surface. The cover 1 is a component of an IC card, such as a PC card or a CF card, and includes a plate 1a which is made of a metal or insulating material. The plate 1a has a single bonding layer 4, to be bonded to the frame 3, on the peripheral portion 2 thereof. The bonding layer 4 is activated by, for example, heat, to bond the cover 1 to the frame 3 by thermocompression.

There are various types of bonding materials including bonding agents and bonding sheets or films, and the bonding layer 4 is formed of one of the bonding materials. For example, the bonding layer 4 is formed of a polyester-based bonding material A or a polyester-polyamide-based bonding material B, which have properties shown in Table 1.

TABLE 1

| Main Component | A<br>Polyester | B<br>Polyester<br>Polyimide |
|---|---|---|
| Loaded Thermal Resistive Temperature (° C.) | 102 | 132 |
| Tensile Shear Bond Strength (kgf/cm$^2$) (Stainless Steel) | 59 | 32 |

The tensile shear bond strength in Table 1 indicates the tensile shear strength when the bonding layer is formed on a stainless steel sheet.

As shown in Table 1, the polyester-polyamide-based bonding material B is resistant to heat to a greater extent than the polyester-based bonding material A, whereas the polyester-based bonding material A has a tensile shear bond strength which is higher than that of the polyester-polyamide-based bonding material B. When the bonding layer 4 is formed using the polyester-based bonding material A, the bonding between the cover 1 and the frame 3 is resistant to impact, but the bonding strength decreases in a high-temperature environment, resulting in separation between the cover 1 and the frame 3. When the bonding layer 4 is formed using the polyester-polyamide-based bonding material B, the cover 1 and the frame 3 are barely separate in a high-temperature environment, but will be readily separated by an impact. Thus, no bonding layer 4 is resistant to both high-temperature environments and to impacts.

The bonding layer 4 must simultaneously have different properties, for example, high resistance to both high-temperature environments and high impact resistance, in order to ensure reliability of bonding of the IC card.

SUMMARY OF THE INVENTION

It is an object of the present invention to provide a bonding surface structure which can improve reliability of bonding of a product and to provide a bonding structure having the bonding surface structure.

In a first aspect of the present invention, a bonding surface structure includes at least two types of adjoining bonding layers having different chemical components formed in a bonding layer forming region.

In the bonding surface structure, a gap is preferably provided between the bonding layers to prevent mixing of the different chemical components.

Alternatively, a barrier is preferably provided between the bonding layers to prevent mixing of the different chemical components.

In the bonding surface structure, the bonding layers are preferably capable of being activated by heat.

Preferably, the bonding layers are formed by a printing process.

In a preferred embodiment, the bonding layer-forming region is a bonding layer forming region of a cover which covers a surface of an IC card.

In a second aspect of the present invention, a bonding structure including a bonding surface structure according to the first aspect, wherein an indented portion is formed on a bonding surface of a counter member with respect to the bonding layer forming region, and at least two bonding layers are overlaid so as to protrude at the position in the bonding layer forming region corresponding to the indented portion so that the indented portion is filled with the protruded bonding layers when the bonding layer forming region is bonded to the bonding surface of the counter member.

In a preferred embodiment of the present invention, for example, bonding layers composed of a bonding material, which is resistant to high-temperature environments but is not resistant to impacts, and bonding layers composed of another bonding material, which is resistant to impacts but is not resistant to high-temperature environments, are alternately formed in a bonding layer forming region. Thus, the entire bonding surface structure is resistant to both high-temperature environments and to impacts.

The bonding surface structure of the present invention can simultaneously satisfy a plurality of requirements by selecting a plurality of bonding layers satisfying the requirements. As a result, a product having this bonding surface structure is highly reliable in various environments.

DESCRIPTION OF THE PREFERRED EMBODIMENT

The preferred embodiments of the present invention will now be described with reference to the attached drawings.

Figure 1:
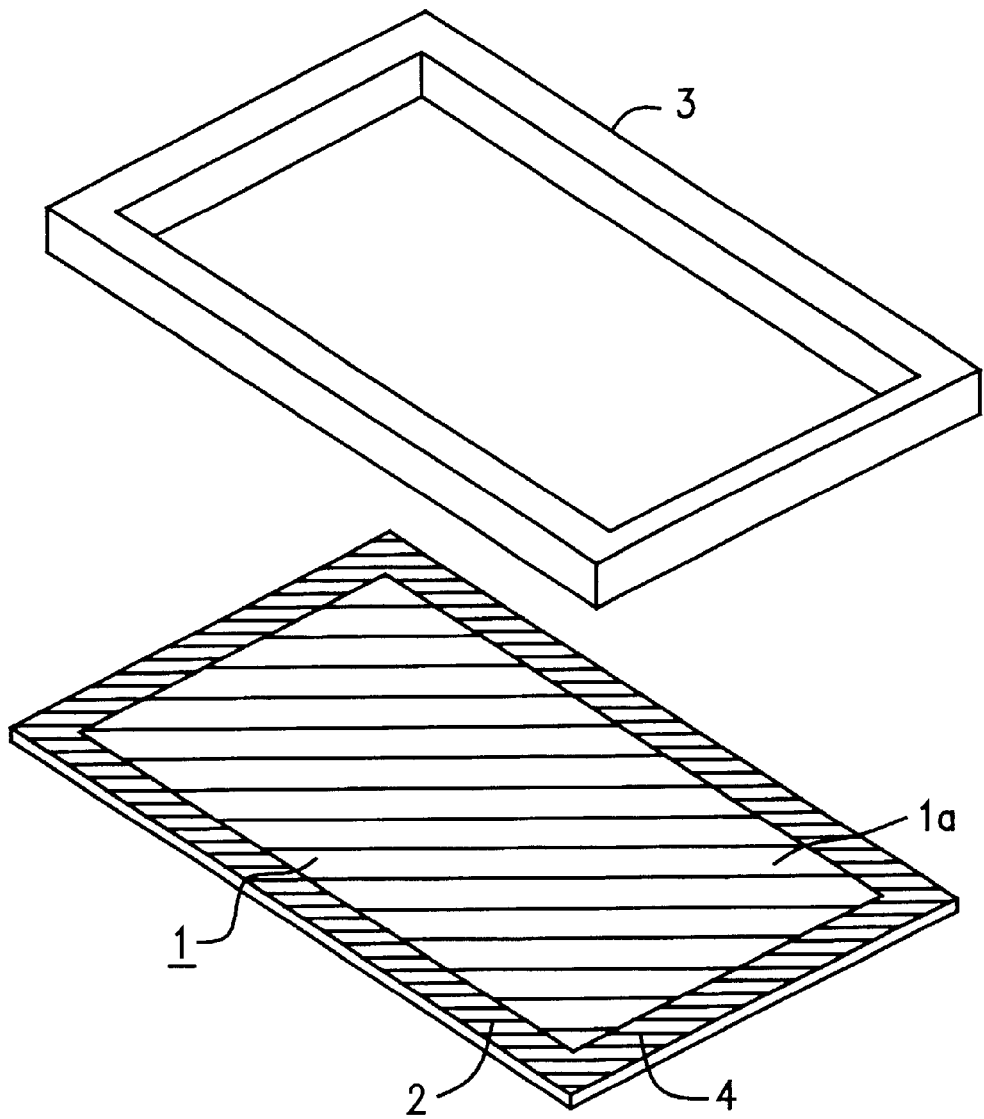
FIG. 1 is an isometric view of a cover for an IC card having a conventional bonding surface structure, and a frame.
Figure 2:
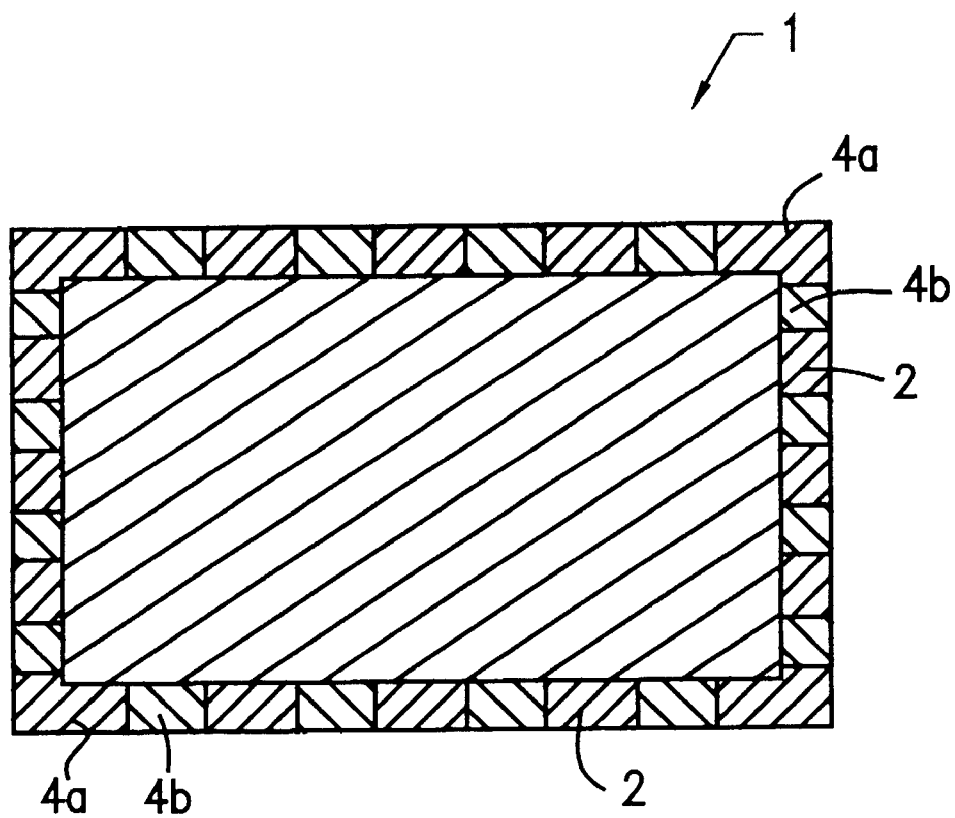
FIG. 2 is a schematic plan view of a cover for an IC card having a bonding surface structure of a first embodiment of the present invention.

FIG. 2 is an exemplary cover for IC cards provided with a bonding surface structure, as a first embodiment of the present invention. The same components as those of the above conventional example are referred to by the same reference numerals without repeated description.

In the first embodiment, two types of bonding layers 4a and 4b are alternately arranged in a bonding layer forming region 2 which is provided in the peripheral region of the cover. These bonding layers 4a and 4b have different chemical components from each other, and thus have different chemical and physical properties. In the first embodiment, these bonding layers 4a and 4b are formed by a printing process, such as screen printing. The bonding layers 4a and 4b are capable of being activated by heat to bond the cover 1 to the frame 3 by thermocompression. When the requirements for the bonding layer forming region 2 include resistance to high-temperature environments and high impact resistance, one of the bonding layers 4a and 4b is formed of, for example, a chloroprene-based bonding material which is resistant to high-temperature environments, and the other of the bonding layers 4a and 4b is formed of, for example, a styrene-butadiene bonding material which is resistant to impacts.

As described above, the bonding layer resistant to high-temperature environments and the adjoining bonding layer resistant to impacts are formed in the bonding layer forming region 2. Thus, the bonding layer forming region 2 is resistant to both high-temperature environments and to impacts. Accordingly, the bonding layer forming region 2 can simultaneously satisfy different requirements which cannot be satisfied by conventional single bonding layer configurations. As a result, the product has improved bonding reliability.

The cover 1 may be deformed in high-temperature environments. Such deformation causes separation of the cover 1 from the frame 3 at corners thereof. In the first embodiment, the bonding layer 4a at each corner of the cover 1 is composed of a bonding material which is resistant to high-temperature environments in order to avoid separation due to thermal deformation.

In the first embodiment, the bonding layers 4a and 4b are precisely formed at predetermined positions in the bonding layer forming region 2 by a printing process. Thus, no overlap portion of the bonding layers 4a and 4b is formed in the bonding layer forming region 2. As a result, the bonding layer forming region 2 has a flat surface which ensures tight bonding between the cover 1 and the frame 3.

A second embodiment of the present invention will now be described. In the second embodiment, the same components as those of the first embodiment are referred to by the same reference numerals without repeated description.

Figure 3A:
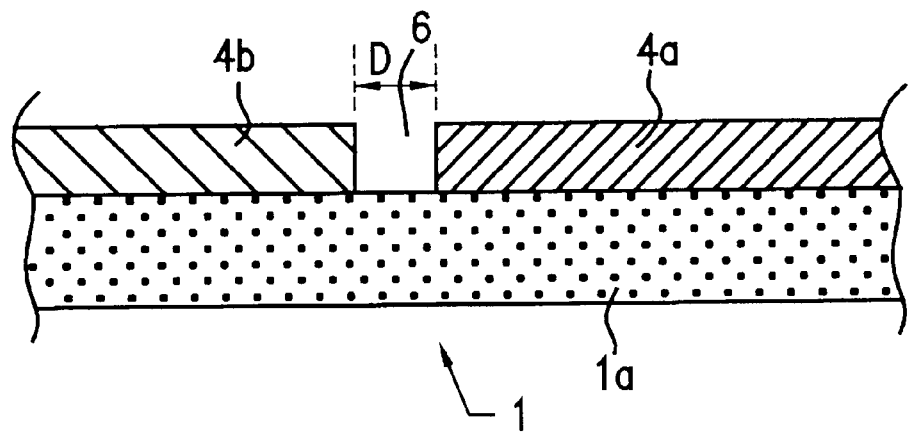
FIGS. 3A and 3B are partial cross-sectional views of bonding surface structures in accordance with a second embodiment of the present invention.

In the first embodiment, mixing of the adjoining bonding layers 4a and 4b will cause chemical reactions and thus will result in decreased bonding strength and other problems in some cases. Thus, a means for preventing mixing between the different bonding layers is provided in the second embodiment. As shown in FIG. 3A, a gap 6 is provided between the different bonding layers 4a and 4b. The gap 6 between the bonding layers 4a and 4b has a width D, for example, of approximately 0.5 mm, which can prevent mixing of the bonding layers 4a and 4b which are activated and laterally expanded during thermocompression.

Figure 3B:
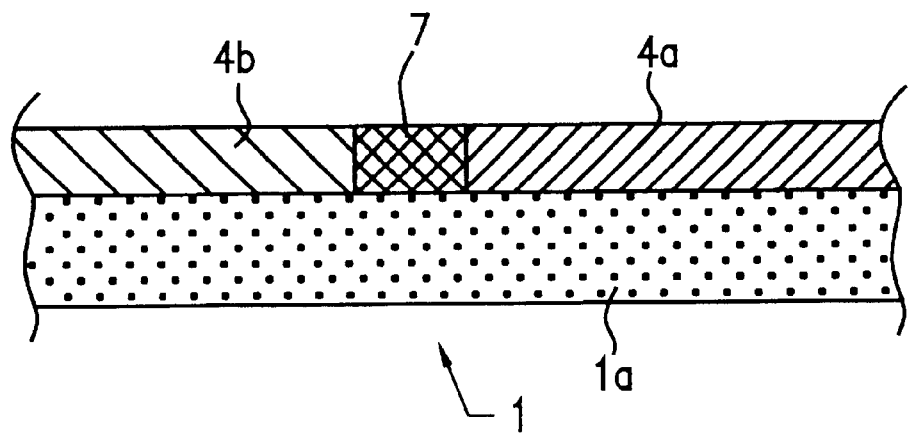

Alternatively, a barrier 7 as a mixing preventing means may be provided between the adjoining bonding layers 4a and 4b, as shown in FIG. 3B. The barrier 7 prevents mixing of the adjoining bonding layers 4a and 4b and can have various configurations. For example, the barrier 7 may be a projection of a plate 1a constituting the cover 1 or a third layer such as a resist layer formed on the plate 1a. The barrier 7 is of an adequate height. For example, the barrier 7 may have a height which is less than the height of the upper surfaces of the bonding layers 4a and 4b in order to ensure bonding of the bonding layers 4a and 4b to the frame 3. Alternatively, the barrier 7 may be formed of a soft material having a height which is greater than the height of the upper surfaces of the bonding layers 4a and 4b so that the barrier 7 and the upper surfaces of the bonding layers 4a and 4b substantially have a flat surface by deformation of the barrier 7 during thermocompression.

Since the gap 6 and the barrier 7 cause decreased surface areas of the bonding layers 4a and 4b, the gap 6 or the barrier 7 is provided so that the decreased surface areas do not adversely affect the bonding strength between the cover 1 and the frame 3. The above mixing preventing means may also be provided between two different bonding layers which do not cause problems due to mixing.

Also, in the second embodiment, the different bonding layers 4a and 4b simultaneously satisfy different requirements, resulting in improved bonding reliability of the product. Moreover, the gap 6 and the barrier 7 provided between the bonding layers 4a and 4b prevent problems due to mixing between the bonding layers 4a and 4b. The gap 6 and the barrier 7 enables a wide variety of combinations of materials for the bonding layers 4a and 4b formed in the bonding layer forming region 2 of the cover 1. Thus, any bonding materials for satisfying the requirements can be used.

The gap 6 provided between the bonding layers 4a and 4b as shown in FIG. 3A can prevent overlap between the different bonding layers 4a and 4b even when slight misalignment of the bonding layers 4a and 4b occurs during printing. Thus, bonding of the cover 1 to the frame 3 is ensured.

A third embodiment of the present invention will now be described. In the third embodiment, the same components as those of the previous embodiments are referred to by the same reference numerals without repeated description.

Figure 4:
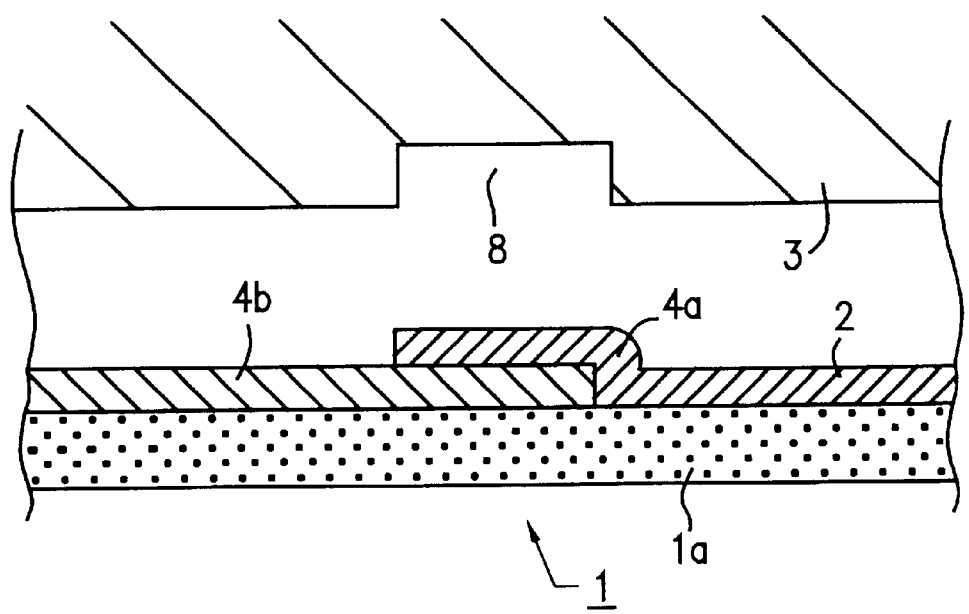
FIG. 4 is a partial cross-sectional view of a bonding surface structure in accordance with a third embodiment of the present invention.

In the third embodiment, as shown in FIG. 4, the frame 3 as a mating part which is bonded to the plate 1a of the cover 1 has an indented portion 8. The bonding layers 4a and 4b are overlaid at the position corresponding to the indented portion 8. Thus, the bonding layers protrude at this position. Other configurations are the same as those in the previous embodiments.

When the cover 1 is bonded to the frame 3 as the mating member by thermocompression, the indented portion 8 on the frame 3 is filled with the protruding bonding layers. Thus, the indented portion 8 on the frame 3 ensures tight bonding between the cover 1 and the frame 3 when the bonding layers protrude at the boundary due to overlap.

The protruding portion can be formed by a two-stage printing process using two bonding materials without additional steps, as in the first and second embodiments.

Figure 5:
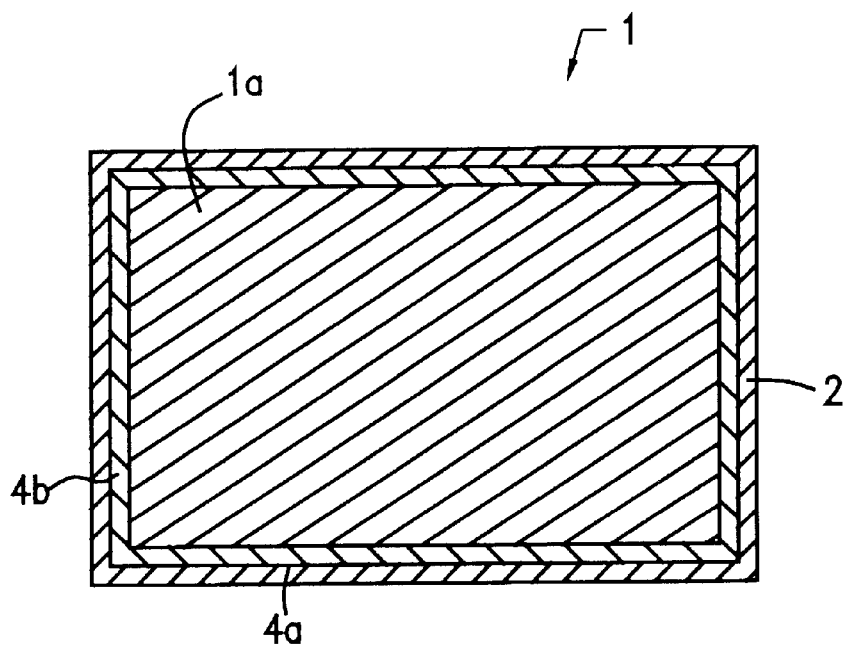
FIG. 5 is a schematic plan view of an arrangement of bonding layers of a bonding surface structure of the present invention.
Figure 6A:
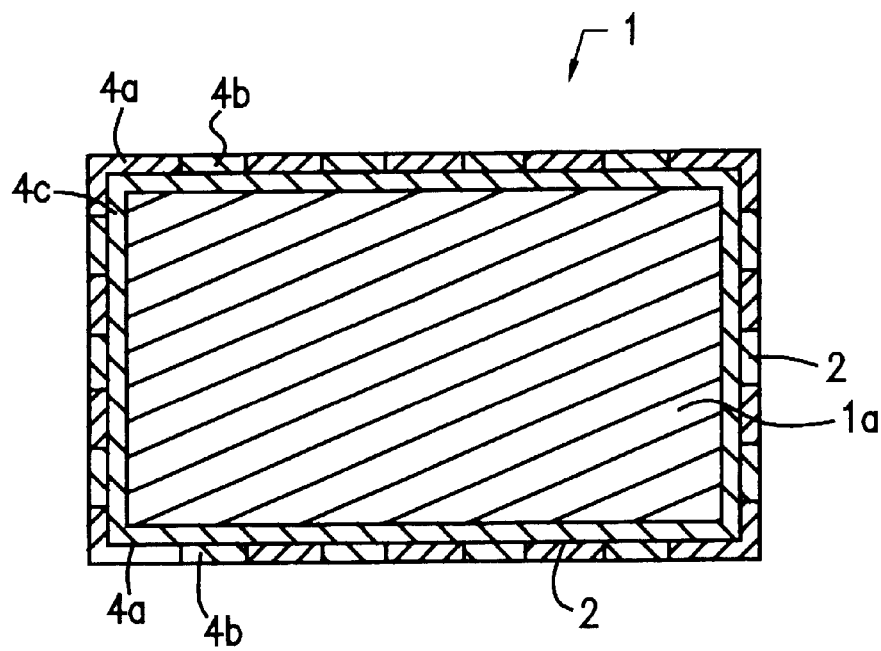
FIGS. 6A and 6B are schematic plan views of arrangements of bonding layers of a bonding surface structure of the present invention.
Figure 6B:
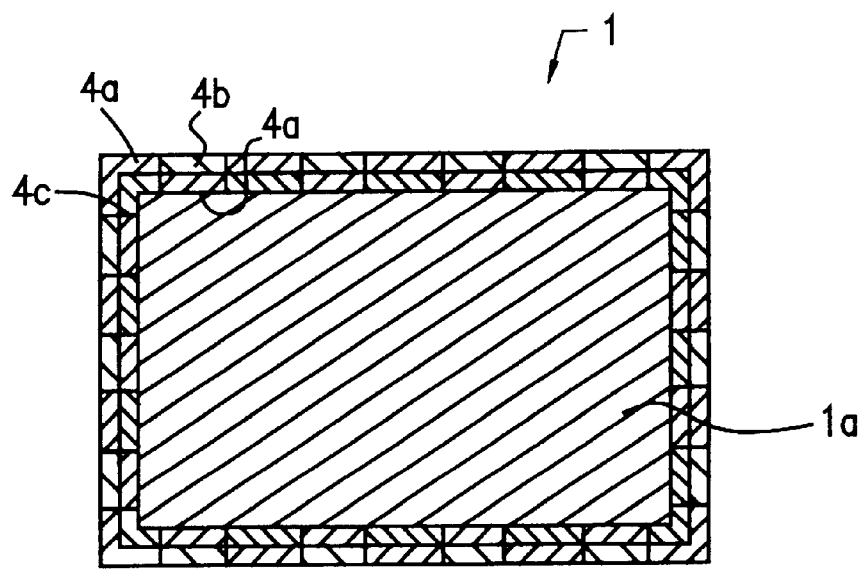

The present invention is not limited to the above-described embodiments, and can include various modifications. For example, three or more bonding layers may be provided in the bonding layer forming region 2. The bonding layers may have various arrangements, as shown in FIGS. 5, 6A, and 6B.

Figure 7:
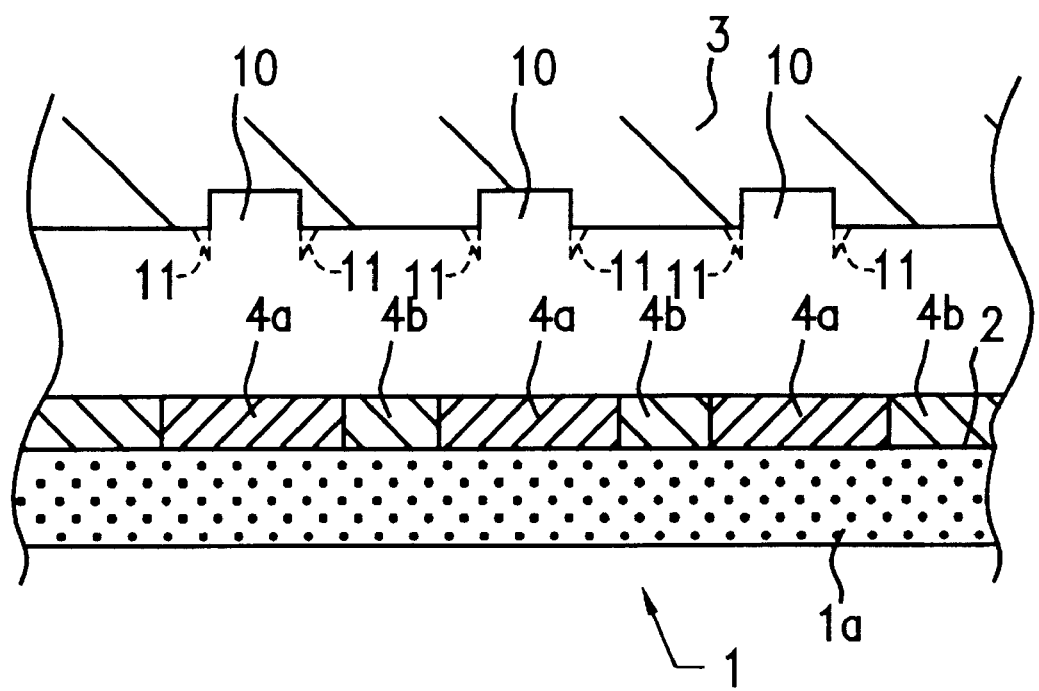
FIG. 7 is a partial cross-sectional view of a bonding surface structure in accordance with an embodiment of the present invention.

The bonding layers 4a and 4b may have any combination of materials having different properties, in addition to the combination of the material resistant to high-temperature environments and the material resistant to impacts, as described in the first embodiment. Preferable combinations are determined in consideration of the requirements for the bonding layers, the shape of the bonding face of the mating member, and other factors. For example, as shown in FIG. 7, when the mating member has indented portions 10, or flashes 11, indicated by dotted lines, on the bonding surface which corresponds to the bonding layer forming region 2, each bonding layer 4a formed at the position corresponding to each indented portion or flash is composed of a material which can be significantly softened by heat. Thus, the indented portions 10 and the peripheral portions of the flashes 11 can be readily filled with the softened bonding layers 4a without formation of voids in these positions. Accordingly, tight bonding between the cover 1 and the mating member is ensured.

Since such bonding layers 4a are not resistant to high-temperature environments, it is preferable that the bonding layers 4b be formed of a material which is resistant to high-temperature environments to compensate for the drawbacks of the bonding layers 4a.

A combination of a bonding layer which is resistant to a temperature range from low temperature to ordinary temperature and a bonding layer which is resistant to a temperature range from ordinary temperature to high temperature yields bonding layers which are adaptable to a wide temperature range from low temperature to high temperature.

In the third embodiment, different types of bonding layers 4a and 4b are overlaid at the position opposing the indented portion 8. Alternatively two bonding layers of the same type may be overlaid at the position. In another preferred embodiment, three or more layers which are composed of the same material or different materials may be overlaid.

The bonding layers are formed by a printing process in the above embodiments. The bonding layers also may be formed by other processes, such as a blowing process. Each bonding layer may be formed of a material which is not activated by heat.

Each of the above embodiments describes a bonding surface structure of the cover 1 of the IC card and a bonding structure between the cover 1 and the frame 3 of the IC card. The bonding surface structure of the present invention, however, is not limited to IC cards, and is applicable to various fields, such as to bonding surface structures of building materials.

When the bonding layers are activated by heat, the bonding layer forming region and the bonding face of the mating member can be tightly bonded with a higher bonding strength.

In a bonding layer forming region of a cover for an IC card, the bonding layers can satisfy many requirements characteristic to the IC card, and bonding in the resulting IC card is highly stable.

What is claimed is:

1. A bonding surface structure comprising a substrate having a bonding layer region on a surface thereof and having at least two bonding layers which are of different adhesive chemical bonding compositions disposed in the bonding layer region, wherein the two bonding layers have elongated coplanar segments each of which has an upper surface and the coplanar segment upper surfaces were disposed in the same plane.

2. A bonding surface structure according to claim 1, having a gap between the bonding layers to prevent mixing of the different chemical compositions.

3. A bonding surface structure according to claim 1, having a barrier between the bonding layers to prevent mixing of the different chemical compositions.

4. A bonding surface structure according to claim 1, wherein the bonding layers are heat activated.

5. A bonding surface structure according to claim 4, wherein the bonding layers are printed layers.

6. A bonding surface structure according to claim 4, wherein the bonding layer forming region is a bonding layer forming region of a cover of an IC card.

7. A bonding surface structure according to claim 1, wherein the bonding layers are printed layers.

8. A bonding surface structure according to claim 7, wherein the substrate is a cover for an IC card which comprises of a cover and a frame.

9. A bonding surface structure according to claim 1, wherein the substrate is a cover for an IC card which comprises of a cover and a frame.

10. A bonding surface structure according to claim 1, having a plurality of bonding layers of a first chemical composition and a plurality of bonding layers of a second chemical composition, wherein the bonding layers are disposed such that each first and second chemical compositions adjoin a layer of the other chemical composition.

11. A bonding surface structure according to claim 1, having elongated layers of the different chemical compositions disposed in a side-by-side relationship.

12. A bonding surface structure according to claim 1, wherein relative to each other, one chemical composition has a higher resistance to high temperature and the other chemical composition has a higher resistance to impact.

13. A bonding surface structure according to claim 12, wherein the bonding layer region includes a corner of the substrate and the chemical composition having the higher resistance to high temperature is disposed at said corner.

14. A bonding structure comprising a bonding surface structure according to claim 11, including a mating member having a bonding surface adapted to cooperated with the bonding surface region of the substrate, wherein the bonding surface of the mating member comprises an indented portion, and wherein at least of said two bonding layers are overlaid so as to protrude at the position in the bonding layer region corresponding to the indented portion so that the protruded bonding layers extend into the indented portion when the bonding layer region is bonded to the bonding surface of the mating member.

15. A bonding structure comprising a bonding surface structure according to claim 8, including a mating member having a bonding surface adapted to cooperated with the bonding surface region of the substrate, wherein the bonding surface of the mating member comprises an indented portion, and wherein at least of said two bonding layers are overlaid so as to protrude at the position in the bonding layer region corresponding to the indented portion so that the protruded bonding layers extend into the indented portion when the bonding layer region is bonded to the bonding surface of the mating member.

16. A bonding structure comprising a bonding surface structure according to claim 6, including a mating member having a bonding surface adapted to cooperated with the bonding surface region of the substrate, wherein the bonding surface of the mating member comprises an indented portion, and wherein at least of said two bonding layers are overlaid so as to protrude at the position in the bonding layer region corresponding to the indented portion so that the protruded bonding layers extend into the indented portion when the bonding layer region is bonded to the bonding surface of the mating member.

17. A bonding structure comprising a bonding surface structure according to claim 4, including a mating member having a bonding surface adapted to cooperated with the bonding surface region of the substrate, wherein the bonding surface of the mating member comprises an indented portion, and wherein at least of said two bonding layers are overlaid so as to protrude at the position in the bonding layer region corresponding to the indented portion so that the protruded bonding layers extend into the indented portion when the bonding layer region is bonded to the bonding surface of the mating member.

18. A bonding structure comprising a bonding surface structure according to claim 3, including a mating member having a bonding surface adapted to cooperated with the bonding surface region of the substrate, wherein the bonding surface of the mating member comprises an indented portion, and wherein at least of said two bonding layers are overlaid so as to protrude at the position in the bonding layer region corresponding to the indented portion so that the protruded bonding layers extend into the indented portion when the bonding layer region is bonded to the bonding surface of the mating member.

19. A bonding structure comprising a bonding surface structure according to claim 2, including a mating member having a bonding surface adapted to cooperated with the bonding surface region of the substrate, wherein the bonding surface of the mating member comprises an indented portion, and wherein at least of said two bonding layers are overlaid so as to protrude at the position in the bonding layer region corresponding to the indented portion so that the protruded bonding layers extend into the indented portion when the bonding layer region is bonded to the bonding surface of the mating member.

20. A bonding structure comprising a bonding surface structure according to claim 1, including a mating member having a bonding surface adapted to cooperated with the bonding surface region of the substrate, wherein the bonding surface of the mating member comprises an indented portion, and wherein at least of said two bonding layers are overlaid so as to protrude at the position in the bonding layer region corresponding to the indented portion so that the protruded bonding layers extend into the indented portion when the bonding layer region is bonded to the bonding surface of the mating member.

* * * * *